May 25, 1937.     L. H. BACKER ET AL     2,081,349
ROASTING APPARATUS
Filed Feb. 8, 1935     3 Sheets-Sheet 3

INVENTORS
Leslie H. Backer
Joseph H. Hansen
BY Joseph L. Hoff
ATTORNEY

Patented May 25, 1937

2,081,349

UNITED STATES PATENT OFFICE 2,081,349

ROASTING APPARATUS

Leslie H. Backer, Summit, N. J., Joseph H. Keenan, Brookline, Mass., and Joseph L. Kopf, East Orange, N. J., assignors to Jabez Burns & Sons, Inc., New York, N. Y., a corporation of New York Application February 8, 1935, Serial No. 5,554

8 Claims. (Cl. 34—5)

This invention relates to an apparatus for roasting coffee, cocoa beans, peanuts, cereals and similar products whereby the finished goods are improved in appearance, development and flavor; wherein their keeping qualities are improved, wherein there is no burning or scorching of the fats or waxes at the surface of the product; the risk of scorching or "spotting" is eliminated; and the cost of roasting is reduced.

Coffee and similar products are roasted to bring about desirable changes therein by the application of heat in definite quantities. It is well established that such changes are most fully and uniformly obtained by relatively rapid processing.

In existing methods, the roasting period may be shortened by increasing the temperature in the roasting chamber. This is done by increasing the output of the heating element, or by reducing the quantity of goods in each batch with relation to the size of the heating element and roasting chamber. To approach an ideal roasting period, the temperature must be raised to a point where expert manipulation and constant watchfulness are necessary to prevent scorching or "spotting" the product. Also, at such temperatures the particles of chaff and light trash are burned; with the result that charred material and an objectionable quantity of smoke are produced, giving the finished product a lusterless or dirty appearance.

In roasting apparatus now almost universally employed, for reasons of economy, convenience and correct development of the product, a further danger of scorching and burning arises from the fact that the heating element is located within the roasting chamber. Thus a portion of the goods is constantly exposed to the searing effect of direct radiant heat, and chaff particles and light trash are free to float into the heating element. In some roasters of this type the product actually comes in contact with the flame or electric element.

Where the advantages of full and uniform development and the economy of rapid production are considered less important than clean, polished appearance in the roasted product, it is common practice to reduce the roasting temperatures by diluting a heating medium with cool air or by cutting down the output of the heating element. Either procedure lengthens the roasting period materially. The former is wasteful of fuel, but has the advantage of carrrying off chaff and light trash more quickly (by the increased draft) so that the waxy luster is not rubbed off the goods by the milling action of such chaff and trash. One of the advantages of our invention as explained below, is that this quick removal of chaff is accomplished without waste of fuel.

We have discovered that if coffee is roasted without being subjected to the action of the radiant heat of an open flame, the bean becomes enveloped in a protective covering or envelope of vapor or the like, of poor heat conductivity. To penetrate this envelope of vapor in old apparatus requires the use of high temperatures or low temperatures for a long period. The high temperatures are undesirable as they cause burning of chaff, while the lower temperatures fail to bring about the desirable changes in the product. In coffee, roasting at very low temperatures results in the dissipation of the moisture content without causing the bean to swell up or develop; dehydration and roasting must be simultaneous.

We have further discovered that if coffee, in the roasting process, is agitated and subjected to a continuous current of heated gaseous medium the protective vapor envelope is wiped off the beans and rapid development or swelling and roasting can be effected with relatively low temperatures.

The quantity of heat units supplied and not the temperature appears to be the governing factor in the speed of roasting, always considering that the temperature is sufficiently high to bring about the full development of the beans. Low temperature heat also has the effect of roasting the beans uniformly from the outside to the inside whereas high temperatures always produce a roasted bean which shades from dark to light, outside to inside. It is therefore desirable to provide an apparatus which shall be capable of supplying large quantities of heat units at a low temperature which will not scorch or burn the coffee or its chaff and thus such heat shall be black and not radiant heat.

In the present invention the heater is outside the roasting chamber. The necessary quantity of heat is rapidly transferred to the product by increasing the volume of gaseous heating medium passing through the roasting chamber instead of increasing the temperature. Thus, in a given time, a greater number of heat units at a relatively low temperature, are supplied to the roasting chamber, than can be supplied by existing methods. This is accomplished by circulating the heating medium at a regulated velocity sufficient to supply the required quantity of heat at a uniform, safe, temperature. At one point in the path of circulation, heat is added to the medium to restore that absorbed by the product and any that may be lost by radiation or otherwise, by passing the circulating medium to a flame which also consumes any chaff, combustible vapors, gases or the like in the medium. When chaff is permitted to act upon coffee while the same is being roasted it has a deleterious effect upon the appearance of the roasted product; a separator for removing the chaff in the circuit of the heating medium is contemplated in this invention.

Further advantages of our invention will be brought out in the following specifications and illustrated in the drawings hereto annexed and forming a part hereof.

Referring to the said drawings.

Figure 1:
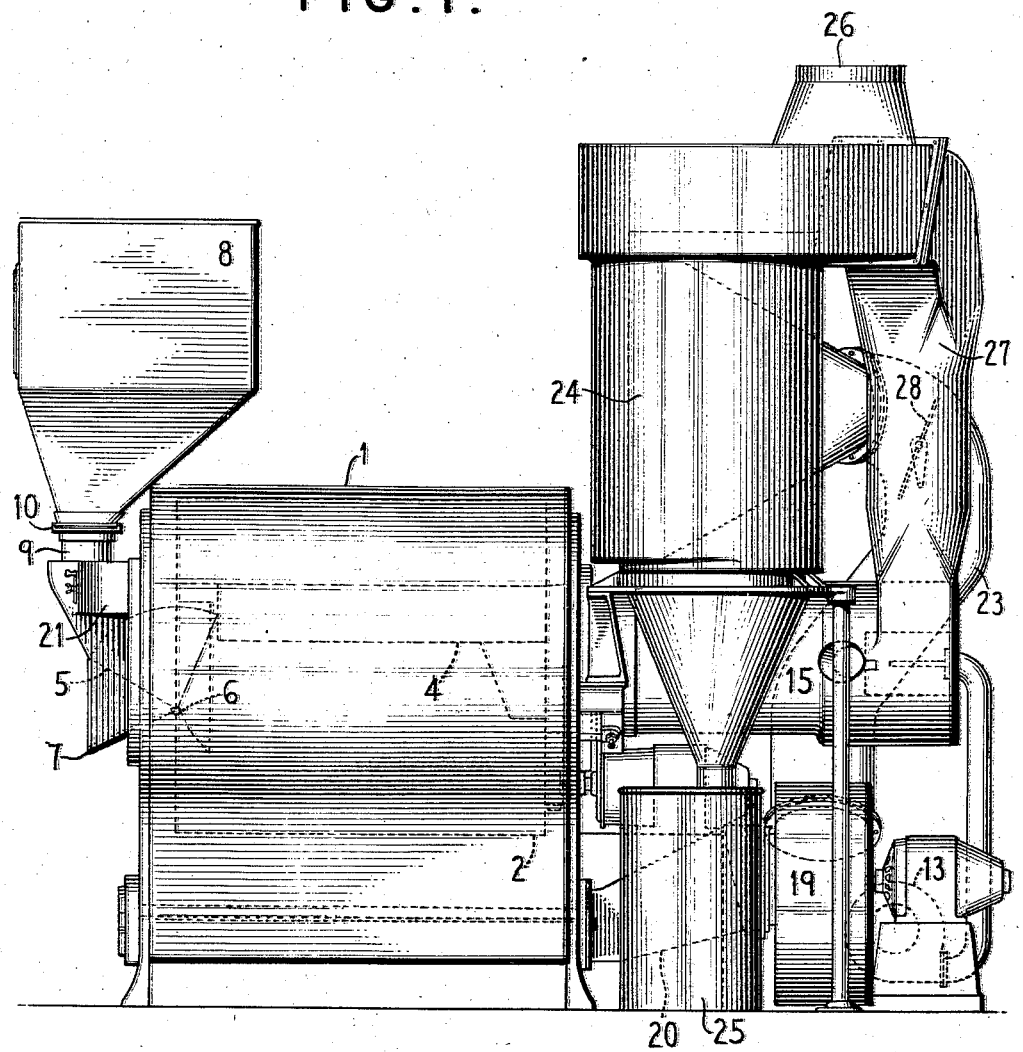
Fig. 1 is a side elevation of the improved device.
Figure 2:
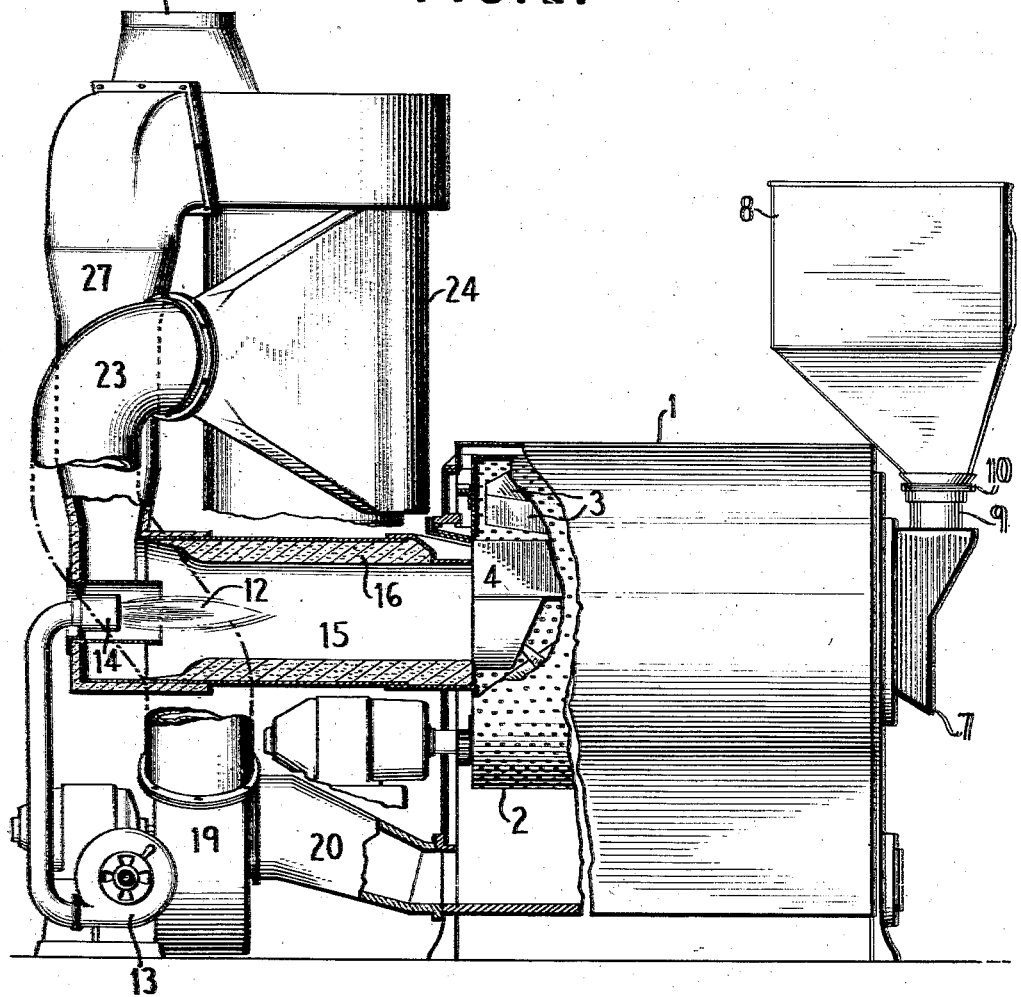
Fig. 2 is a side elevation taken from the side opposite Fig. 1, partly in section showing the heating chamber and cylinder.
Figure 3:
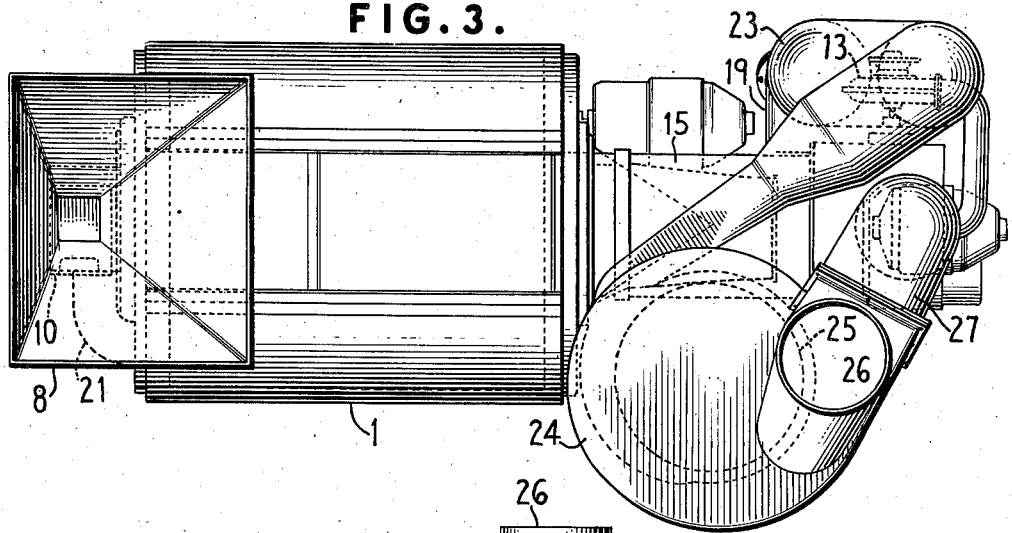
Fig. 3 is a top plan view.
Figure 4:
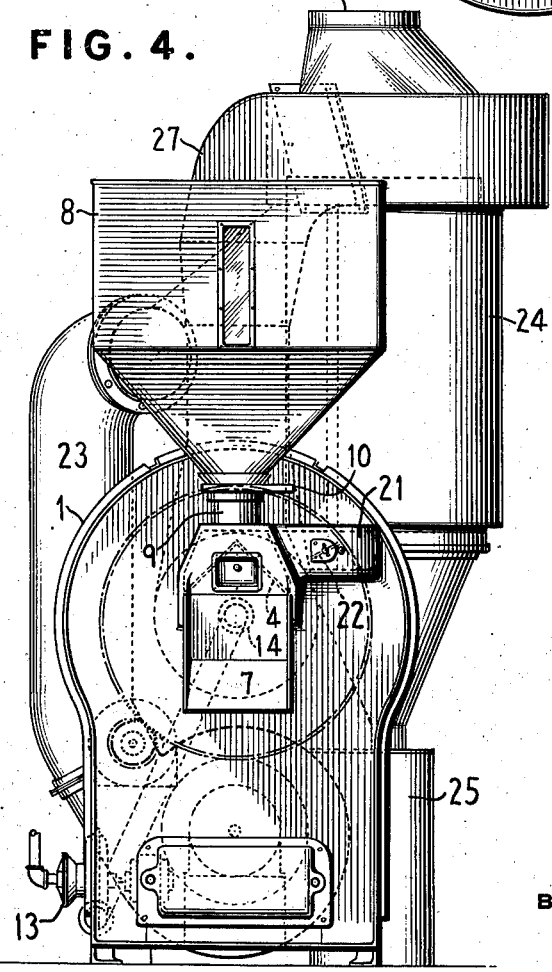
Fig. 4 is an end elevation.

Referring to the drawings, 1 is an insulated roaster casing in which is mounted a rotatable perforated cylinder or carrier 2 adapted to hold the material to be roasted. Cylinder 2 is rotated in any suitable manner.

A plurality of mixing vanes 3 are arranged inside cylinder 2 for the purpose of carrying the material from the bottom to the top and constantly agitating it during roasting. Within the central portion of the cylinder and supported by the rear end of casing 1 is a tent-shaped hood or spreader 4. Vanes 3 lift the material to be roasted and drop it on hood 4.

Swing gate 5 is pivoted at 6 to the front head of the roaster. When this gate is swung forward, as shown in dotted lines in Fig. 1 of the drawings, it covers discharge chute 7 and permits raw material to be fed from hopper 8 through feed pipe 9 into cylinder 2, the flow of material being controlled by the gate 10. When gate 5 is swung back to the position shown in the broken lines in Fig. 1 it acts as an outlet directing the roasted material through discharge chute 7 into any suitable cooler for rapid cooling as hereinafter described.

The heating flame 12 may be provided by a burner of any suitable type such as a motor-driven blower 13 arranged to mechanically premix gas with the proper volume of air for most efficient combustion and discharge the mixture through nozzle 14 disposed in heating chamber 15. The heating chamber 15 preferably has an inner lining 16 of fire clay or other refractory or heat-resisting material and opens into the rear end of cylinder 2 beneath hood 4. A temperature indicating device (not shown) may be mounted beneath the hood 4 adjacent to heating chamber 15 in any suitable manner for the purpose of indicating the temperature of the heating medium as it enters the roasting cylinder.

An exhaust fan 19 is connected to the roaster casing 1 by suction pipe 20. A suction pipe 21 containing a damper 22 offers a free communication or by-pass between the inside of the roaster cylinder 2 and the roaster casing 1 through the feed inlet. An outlet pipe 23 from the fan 19 is connected to a separator 24 of any suitable type for removing chaff and light trash which drops into receptacle 25. The top of the separator 24 opens into a discharge pipe 26, which leads to the atmosphere, and into a return pipe 27 which is connected to the heating chamber 15 adjacent to burner nozzle 14. Return pipe 27 contains damper 28 which controls the flow of gases returning to heating chamber 15.

In operation, a quantity of raw material is fed into the revolving cylinder 2, and the feed gate 10 is then closed. Fan 19 is started, setting up a circulation of the heating medium through the several chambers and pipes of the closed system; and the damper which controls the circulation of heated gases is set as hereinafter explained. The heating element is turned on and regulated, to supply heat at the rate which will complete the roast in predetermined length of time.

The gaseous medium passes from heating chamber 15 into the central portion of the roasting cylinder under the hood and then outward, through the surrounding wall of material and the perforated shell. A large proportion of its heat is absorbed in passing through the material in the roasting cylinder, hence the gases are returned to the heating chamber 15 at considerably lower temperature, passing through pipe 20, fan 19, pipe 23, separator 24 and pipe 27. Chaff and light trash are drawn out through the cylindrical perforations and also at the front head by the suction pipe 21 and pass down to the lower portion of the casing 1 and through pipe 20 and are separated in the collector or separator 24.

Since heat is liberated in the flame at a constant rate, the temperature in the roasting cylinder may be lowered by increasing the flow of gases through the system; and the temperature may be raised by decreasing the flow. The circulating damper 28 should therefore be set to regulate the flow of returning gas in such a way that the highest temperature of the roasting cycle (at the end of the roast) will be below the point at which the goods scorch or the chaff burns. This damper setting is determined by the temperature indicator during a trial roast.

The fan and duct system are so designed that a temperature range of 600 to 800 degrees Fahrenheit can be maintained at the point where the heating chamber enters the roasting cylinder. If the pressure in the roasting cylinder is held approximately at atmospheric pressure, the rate of gas flow in the circulating duct can be controlled by adjusting the control damper 28 to give the desired temperature in the roasting cylinder.

If a combustion heating element is employed, the products of combustion are continuously added to the heating medium. As the roast progresses there is also added a large volume of gases given off by the product itself. These gases rapidly dilute the original air constituting the heating medium so that the proportion of oxygen becomes very small and the nitrogen content is reduced. The increase of $CO_2$ and water vapor from the combustion and the roasting is advantageous because the former contributes to heat transfer to the coffee by its greater capacity for radiation as a dark body, and the latter by its slight reduction in fan power. However, the increase in the total volume of the heating medium is corrected by discharging the excess through the bleeder pipe 26.

In order to make it possible to supply a constant air flow to the flame with the simplest type of blower, it is desirable to maintain approximately atmospheric pressure in any roaster cylinder which is being supplied with heat from the combustion of a fuel. The evolution of gases from the coffee in the course of the roast will result in a pressure rise within the cylinder unless permitted to escape freely through the bleeder. By adjusting the damper 28 during the roast, the temperature of the heating medium entering the roasting cylinder can be kept constant while maintaining the cylinder pressure at atmospheric pressure. However, more volume and lower temperature heat medium can be attained in the early part of the roast by keeping the circulating damper 28 wide open adjusting only toward the end of the roast.

With coffee and some similar products smoke is given off just before the end of the roast. By our method of circulation this smoke is quickly carried off by the gases and does not return to soil the goods. The greater part is burned in the heating chamber 15 and the remainder discharged through the bleeder 26.

The process is continued, as above described, until the product is roasted to the desired color. It is then discharged through the swing gate 5 and chute 7 into a suitable cooler box wherein the temperature is rapidly reduced to prevent further roasting due to the heat in the coffee itself.

In another form, the apparatus is constructed without the damper 28. In this case the gaseous medium flow is constant and temperature changes are secured by means of a control (not illustrated) in the fuel line.

Green coffee has a remarkable capacity for the absorption of heat units. This ability of coffee to take up heat decreases from the beginning to the end of a roast. It is desirable that the temperature within the roaster cylinder be kept constant, therefore, as the temperature drop from the inside to the outside of material and cylinder is greatest when the coffee is green, to maintain a constant temperature with a constant gaseous medium flow, it is necessary to decrease the heat input. The preferred form is to make this reduction by a great number of small changes which would result in a straight-line heat-input reduction but for practical purpose this may be accomplished in a step-by-step manner at predetermined intervals of roasting progress.

It is apparent that various changes may be made in the details of construction without departing from the scope of the invention.

This application is a continuation in part of our application Serial No. 662,227, filed March 23, 1933, Patent #1,991,190, February 12, 1935.

The invention claimed is:

1. In a roaster for coffee, cocoa beans, peanuts and the like, the combination with a roasting chamber, of a heating chamber located at one end of said roasting chamber and directly communicating therewith, a heating element for creating incandescence in said heating chamber, and means for withdrawing the gases from said roasting chamber through the material to be roasted and for repassing the gases to said heating chamber back of and then in contact with and along the source of heat to reheat the gases and burn the smoke particles before again entering said roasting chamber.

2. In a roaster for coffee, cocoa beans, peanuts and the like, the combination with a roasting chamber, of a heating chamber located at one end of said roasting chamber and directly communicating therewith, a heating element for creating a flame in said heating chamber, and means for withdrawing the gases from said roasting chamber through the material to be roasted and for repassing the gases to said heating chamber back of and then in contact with and along said flame to reheat the gases and burn the smoke particles before again entering said roasting chamber.

3. In a roaster for coffee, cocoa beans, peanuts and the like, the combination of a roasting chamber, an element within said roasting chamber containing the material to be roasted and having means for agitating the material, a heating chamber located at one end of said element and communicating directly therewith, a heating element for creating incandescence in said heating chamber, and means for withdrawing the gases from said roasting chamber through the material and for repassing the gases to said heating chamber back of and then in contact with and along said source of heat to reheat said gases and burn the smoke particles before again entering said roasting chamber.

4. In a roaster for coffee, cocoa beans, peanuts and the like, the combination of a roasting chamber, an element within said roasting chamber containing the material to be roasted and having means for agitating the material, a heating chamber located at one end of said element and communicating directly therewith, a heating element in said heating chamber for creating a flame, and means for withdrawing the gases from said roasting chamber through the material and for repassing the gases to said heating chamber back of and then in contact with and along said flame to reheat said gases and burn the smoke particles before again entering said roasting chamber.

5. In a roaster for coffee, cocoa beans, peanuts and the like, the combination of a roasting chamber, a rotatable perforated cylinder containing the material to be roasted, a heating chamber located at one end of said cylinder and communicating directly therewith, a heating element for creating incandescence in said heating chamber, and means for withdrawing the gases from said roasting chamber through the material and for repassing the gases to said heating chamber back of and then in contact with and along said source of heat to reheat said gases and burn the smoke particles before again entering said roasting chamber.

6. In a roaster for coffee, cocoa beans, peanuts and the like, the combination of a roasting chamber, a rotatable perforated cylinder containing the material to be roasted and having means for agitating the material, a fixed protective hood within said cylinder, a heating chamber located at one end of said cylinder and communicating directly therewith, a heating element for creating incandescence in said heating chamber, and means for withdrawing the gases from said roasting chamber through the material and for repassing the gases to said heating chamber back of and then in contact with and along said source of heat to reheat said gases and burn the smoke particles before again entering said roasting chamber and before passing under said hood.

7. In a roaster for coffee, cocoa beans, peanuts and the like, the combination with a roasting chamber, of a heating chamber containing a source of incandescent heat in communication with said roasting chamber, a suction device connected with said roasting chamber for withdrawing the gases from said roasting chamber through the material to be roasted, a separator connected to said device for removing foreign material, return means from said separator and device to said heating chamber for passing the gases to said heating chamber back of and then in contact with and along said source of incandescent heat for reheating said gases and burning the smoke particles before passing to the roasting chamber, and an outlet to atmosphere located in said return means from said separator and device and before the connection to said heating chamber for discharging excess gases.

8. In a roaster for coffee, cocoa beans, peanuts and the like, the combination of a roasting chamber, an element within said roasting chamber containing the material to be roasted and having means for agitating the material, a heating chamber containing a source of heat in communication with said roasting chamber and with one end of said containing element, means connected with said roasting chamber for withdrawing the gases from said roasting chamber through the material to be roasted and for repassing the gases to said heating chamber, and a bypass from the opposite end of said containing element to the roasting chamber for the passage of foreign material from the interior of said containing element to the roasting chamber.

LESLIE H. BACKER.
JOSEPH H. KEENAN.
JOSEPH L. KOPF.